(12) United States Patent
Baek et al.

(10) Patent No.: US 7,813,768 B2
(45) Date of Patent: Oct. 12, 2010

(54) DIALING SCREEN METHOD AND LAYER STRUCTURE FOR A MOBILE TERMINAL

(75) Inventors: Sung-Hwan Baek, Suwon-si (KR); Jin-Yong Kim, Suwon-si (KR); Kyoung-Sik Yoon, Seongnam-si (KR); Hee-Woong Choi, Seoul (KR); In-Won Jong, Anyang-si (KR); Hee-Kyung Jeon, Seoul (KR)

(73) Assignee: Samsung Electronics Co., Ltd., Maetan-Dong, YeongTong-Gu, Suwon-Si, Gyeong-Gi-Do, Korea (KR)

( * ) Notice: Subject to any disclaimer, the term of this patent is extended or adjusted under 35 U.S.C. 154(b) by 508 days.

(21) Appl. No.: 11/982,030

(22) Filed: Oct. 31, 2007

(65) Prior Publication Data
US 2008/0153552 A1 Jun. 26, 2008

Related U.S. Application Data

(63) Continuation-in-part of application No. 11/805,690, filed on May 24, 2007.

(30) Foreign Application Priority Data
May 25, 2006 (KR) ...................... 10-2006-0047044

(51) Int. Cl.
*H04M 1/00* (2006.01)
(52) U.S. Cl. .................. 455/566; 345/619; 345/23; 345/25
(58) Field of Classification Search ........... 455/566; 345/619, 23, 25
See application file for complete search history.

(56) References Cited

U.S. PATENT DOCUMENTS

| 6,728,533 | B2 * | 4/2004 | Ishii | 455/425 |
| 2002/0116380 | A1 * | 8/2002 | Chen et al. | 707/7 |
| 2006/0166708 | A1 * | 7/2006 | Kim et al. | 455/573 |
| 2006/0276234 | A1 * | 12/2006 | Kang et al. | 455/566 |
| 2007/0275736 | A1 * | 11/2007 | Baek et al. | 455/457 |

FOREIGN PATENT DOCUMENTS

| KR | 2005-32258 | 4/2005 |
| KR | 2005-82209 | 8/2005 |

* cited by examiner

*Primary Examiner*—Edward Urban
*Assistant Examiner*—Golam Sorowar
(74) *Attorney, Agent, or Firm*—Cha & Reiter, LLC

(57) ABSTRACT

A method for providing a dialing screen which visually changes depending on status information providable through a mobile terminal. Particularly, the dialing screen (such as an alphanumeric character inputting screen) displays status information including network status information, time-zone information of a transmitting side or receiving side, etc., which can be provided through the mobile terminal, with graphic elements thereof embossed. Therefore, it is possible to output a dialing screen in which specific status information is reflected, so that the various tastes of the users can be reflected in the dialing screen and simultaneously visibility of the transmitted information increases. The method may include the steps of determining a received signal strength and a current time zone of the mobile communication terminal and displaying an animation data on a background image wherein the animation data changes based on the strength of the received signal.

8 Claims, 8 Drawing Sheets

DIALING SCREEN METHOD AND LAYER STRUCTURE FOR A MOBILE TERMINAL

CROSS REFERENCE TO RELATED APPLICATIONS

This application is a continuation-in-part of U.S. application Ser. No. 11/805,690, filed May 24, 2007 and claims the benefit of the earlier U.S. filing date in accordance with 35 U.S.C. §120, which is incorporated by reference.

PRIORITY

This application claims the benefit under 35 U.S.C. 119(a) of an application filed in the Korean Intellectual Property Office on May 25, 2006 and assigned Serial No. 2006-47044, the entire contents of which are incorporated herein by reference.

BACKGROUND OF THE INVENTION

1. Field of the Invention

The present invention relates to a mobile terminal, and more particularly to a method for providing a dialing screen for a mobile terminal.

2. Description of the Related Art

With recent wide spread use of mobile terminals, mobile terminals have been provided with various convenient services in addition to a basic telephone communication function. In addition, while the number of services and additional functions gradually increases, the screen of a mobile terminal has shown a tendency to have a larger size and an increased number of colors therein. As demands of users become more varied and detailed as compared with those in the former days, it has been necessary to more efficiently use the space of a mobile terminal's screen and to utilize the space in various schemes. Also, it has been necessary to satisfy various demands of users and to give a priority to user convenience.

However, although a current mobile terminal can provide sound and a screen image, which are desired by users, through a download service, the current mobile terminal provides, through a dialing screen thereof, only an unique font and a monotonous background, as shown in FIG. 1.

The conventional dialing screen shown in FIG. 1 includes a background layer 10 for providing a single background constructed with a single color, a character input layer 20 for displaying key input data according to key presses, and an icon layer 30. The icon layer 30 displays various symbols or images, such as a battery displaying a battery capacity, an antenna displaying reception sensibility, a clock displaying time information, etc., in order to report the current status of the mobile terminal to the user.

Since the conventional dialing screen having such a layer structure displays the current status of the mobile terminal through only the icon layer 30, it has a problem in that visibility of displayed information is poor.

In addition, the development tendency of the user interface for a mobile terminal has recently focused upon information expression capable of satisfying the taste of each user, rather than upon exact information transmission. Therefore, a need exists in information transmission to develop a new interface which can increase the visibility of transmitted information and give pleasure to the users through various information expression.

SUMMARY OF THE INVENTION

As described above, a conventional mobile terminal displays network status and time information in a dialing screen (also referred to as an alphanumeric character inputting screen) while changing only the shape and size of each corresponding icon. Such a method displays only a uniform screen image although the mobile terminal can provide various graphic images, which seems monotonous to the user and drops the efficiency from the viewpoint of utilizing various colors and enlarged screen of the mobile terminal. Therefore, in order to increase the effective value of the screen in a mobile terminal and to satisfy various demands of users, a method capable of reflecting various demands of the users and simultaneously increasing visibility of transmitted information is provided by the present invention.

Accordingly, the present invention provides a layer structure providing method, a dialing screen providing method using the same, and a mobile terminal employing the same, which can construct a dialing screen changing according to status information providable by the mobile terminal, so as to increase visibility of information provided through the mobile terminal and to satisfy the taste of each user.

In accordance with one aspect of the present invention, there is provided a layer structure providing method for construction of a dialing screen in a mobile terminal, the layer structure providing method including providing a time layer to display a background image representing a time zone; providing reception sensibility layer to display a preset visual effect image on the background image, the preset visual effect image changing depending on an intensity of a received signal; and providing a character input layer to display a character on the background image in which the visual effect image is displayed, wherein the character is input in response to a character output request in the mobile terminal. The character output request, for example, may comprise at last one of a key input for dialing and a key input for a text message composition.

In accordance with another aspect of the present invention, there is provided a dialing screen providing method in a mobile terminal, the dialing screen providing method including identifying an intensity of a received signal and a current time zone; displaying a screen in which a visual effect image preset corresponding to the intensity of the received signal is output on a background image according to the current time zone; and displaying a character, which is input in response to a character output request in the mobile terminal, on the screen.

In accordance with still another aspect of the present invention, there is provided a mobile terminal for providing a dialing screen, the mobile terminal including a memory for storing data for a display item for each layer; a key input unit for providing key input data according to a key input of a user; a controller for constructing a dialing screen upon entering a dialing mode, and controlling a character according to the key input to be displayed on the dialing screen, wherein a visual effect image preset to report an intensity of a currently received signal is overlapped on a background image representing a current time zone in the dialing screen; and a display unit for overlapping and displaying the visual effect image and the input character on the background image under a control of the controller.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
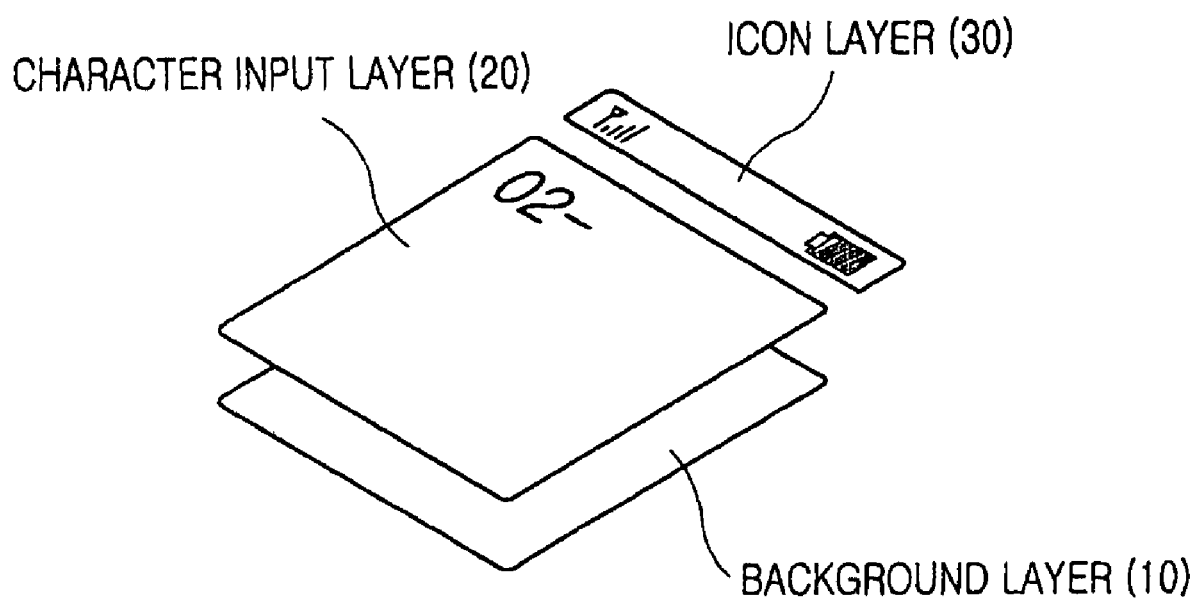
FIG. 1 is a view illustrating an example of a layer structure for a conventional dialing screen.

Hereinafter, embodiments of the present invention will be described with reference to the accompanying drawings. It is to be noted that the same elements are indicated with the same reference numerals throughout the drawings. In the following description of the embodiments of the present invention, a detailed description of known functions and configurations incorporated herein will be omitted when it may obscure the subject matter of the present invention.

The present invention provides a function of providing a dialing screen which visually changes depending on status information providable through a mobile terminal. Particularly, according to an exemplary embodiment of the present invention, the dialing screen displays status information including network status information, time-zone information of a transmitting side or receiving side, etc., which can be provided through the mobile terminal, with graphic elements thereof embossed. According to the present invention, it is possible to output a dialing screen in which specific status information is reflected, so that there is an effect in that the various tastes of the users can be reflected in the dialing screen and simultaneously visibility of the transmitted information can increase.

The construction and operation of a mobile terminal having the above-mentioned function will now be described with reference to FIG. 2 which shows a mobile terminal according to the present invention.

Figure 2:
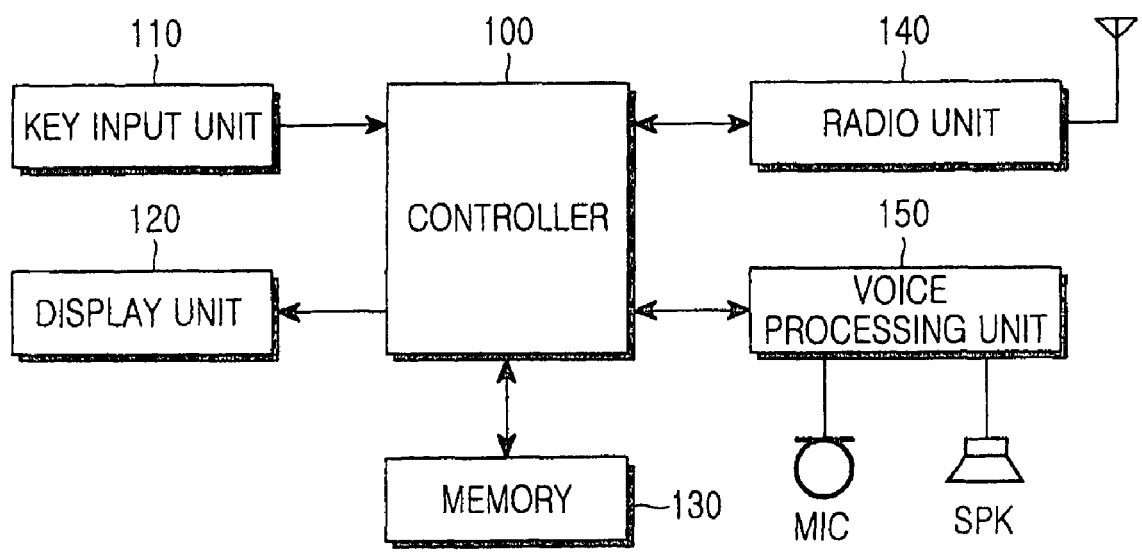
FIG. 2 is a block diagram of a mobile terminal according to the present invention.

The mobile terminal in FIG. 2 includes a controller 100, a key input unit 110, a display unit 120, a memory 130, a radio unit 140, and a voice processing unit 150.

The controller 100 controls operation of the mobile terminal. Particularly, the controller 100 controls status information for the present invention to be reflected in a visual theme set by the user, and controls a dialing screen according to the visual theme to be output through the display unit 120. The dialing screen, in which status information is reflected, is output with a visual effect image which changes depending on preset visual themes.

The controller 100 periodically measures reception sensibility (i.e., Received Signal Strength Indication (RSSI)) that represents a degree of reception power received from a network, and displays a dialing screen which includes a predefined specific visual effect image corresponding to a measured value. That is, a visual effect image corresponding to the measured value based on a predetermined visual theme is output on the dialing screen. Also, the controller 100 reflects time-zone information, as well as reception sensibility, in the dialing screen. The time-zone information may include time-zone information of a transmitting side (i.e., the current time zone of the mobile terminal) or time-zone information of a receiving side. In order to recognize time-zone information of a receiving side, the controller 100 determines whether a key string input for dialing by the user includes a country code that represents a specific country. When the key string includes a country code, the controller 100 identifies a local time zone based on the country code and determines a background image corresponding to the identified local time zone. The background image may include not only a local time zone but also a specific image, e.g., an emblem, representing the corresponding country.

For example, when a visual theme is set as "weather", reception sensibility may be expressed by means of the amount of clouds, and time-zone information may be expressed by means of various background images such as dawn, morning, day, afternoon, evening, night, etc. The visual effect image or images comprise any of actual or animated images of clouds, and a person of ordinary skill in the art should appreciate that such animation data may comprise any of moving or station animated images, or moving or stationary photos. An animated image of clouds (or any other designated visual theme), or a scene from a well known movie or event showing the theme could be displayed. Accordingly, in the exemplary embodiment, a cloud having a visual effect image corresponding to the degree of reception sensibility is overlapped on a background image according to a corresponding time zone, thereby outputting, on the display unit 120, a dialing screen which can report the current status of a network for the mobile terminal and a time zone of the transmitting side or receiving side. A procedure of constructing a dialing screen by reflecting status information (such as network status information, time-zone information, etc.), which can be provided by the mobile terminal, in a visual theme will be described later.

Meanwhile, although the present invention is described with respect to a dialing screen, a visual effect image according to the present invention may be applied to all screens, such as a message composition screen for the user to write a message (such as a text message), in which characters can be input.

The key input unit 110 is an interface device for the user. The key input unit 110 includes a plurality of keys which contains various function keys, numeric keys of 0 to 9, and specific keys of "*", "#", etc., so as to provide key input data corresponding to a key pressed by the user to the controller 100. That is, the key input unit 110 outputs specific key input data according to input of each key. The key input data output from the key input unit 110 are applied to the controller 100, and then the controller 100 detects a key signal corresponding to the applied key input data, and then performs a corresponding operation according to a result of the detection.

The display unit 120 receives and displays display data corresponding to key input data inputted from the key input unit 110 under the control of the controller 100, or displays an operation state of the mobile terminal and various information by means of icons and characters. Also, when the user sets or operates a necessary function, the display unit 120 enables the user to visually recognize the set function or operational function. In addition, according to the present invention, the display unit 120 displays a dialing screen including a visual effect image according to status information providable through the mobile terminal.

The memory 130 includes a Read Only Memory (ROM) and a Random Access Memory (RAM) for storing a plurality of programs and data. According to the present invention, the memory 130 stores data for display items for each layer according to a visual theme and time-zone information corresponding to specific country codes. Also, the memory 130 stores predetermined visual themes, and establishes a visual theme selected by the user as a basic visual theme.

The radio unit 140 is connected to the controller 100. The radio unit 140 converts voice data and control data into a radio signal and then transmits the radio signal, and converts a radio signal into voice data and control data and then outputs the voice data and control data.

The voice processing unit 150 is also connected to the controller 100. The voice processing unit 150 converts voice data received from the controller 100 into an audible sound and then outputs the audible sound through a speaker, and converts a voice signal received through a microphone into data and then transmits the data to the controller 100. Also, according to the present invention, the voice processing unit 150 may output a sound effect according to a corresponding visual theme when a key for dialing is input.

Figure 3:
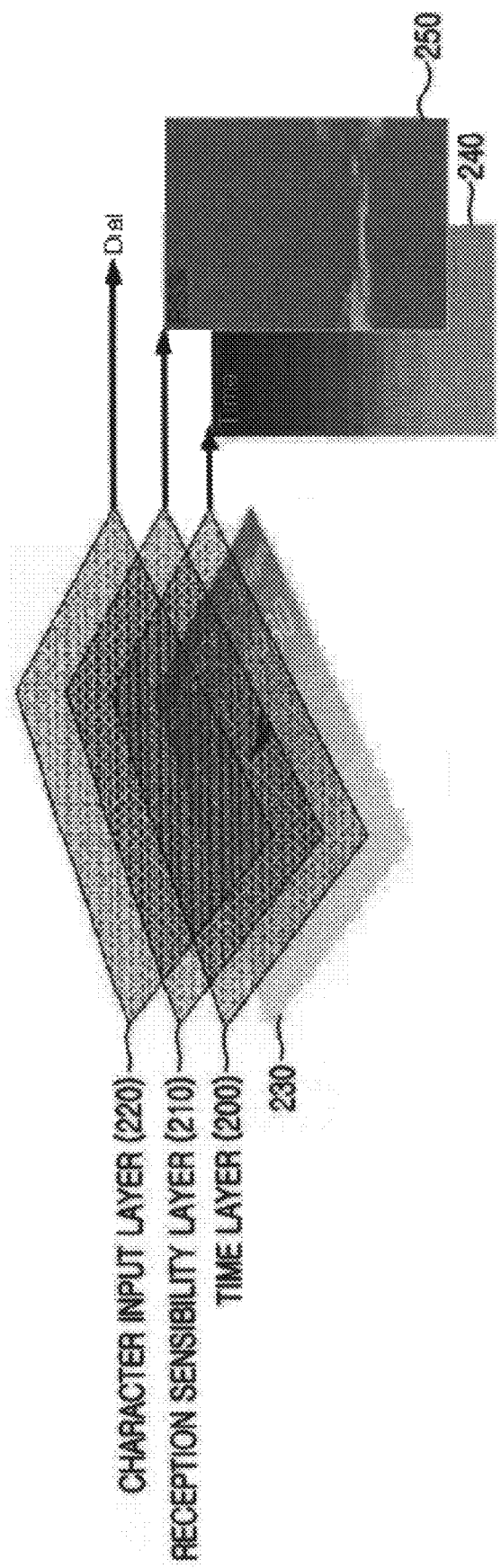
FIG. 3 is a view illustrating a layer structure for a dialing screen in a mobile terminal according to the present invention.

Hereinafter, a layer structure for a dialing screen, which changes depending on status information, in the mobile terminal having the above-mentioned construction will be described. FIG. 3 shows a layer structure for a dialing screen in a mobile terminal according to an exemplary embodiment of the present invention.

The dialing screen 230 includes a time layer 200 for providing a background image representing a time zone, reception sensibility layer 210 for outputting a visual effect image changing depending on reception sensibilities so as to report a degree of reception sensibility, and a character input layer 220 for displaying characters or dialing key input data according to input of the user. In principle, the visual effect image is provided in such a manner to overlap the key input data displayed by the character input layer 220 while being visually distinguished from the key input data, on a background image provided by the time layer 200.

Accordingly, a background image as indicated by a reference number "240" is provided through the time layer 200, and a visual effect image according to reception sensibility, as indicated by a reference number "250", is provided through the reception sensibility layer 210. A dialing screen constructed as described above forms the dialing screen 230 and is provided to the user. Particularly, the dialing screen 230 shown in FIG. 3 illustrates a good reception sensibility through few clouds included therein, and a day through a background image displayed therein.

Figure 4:
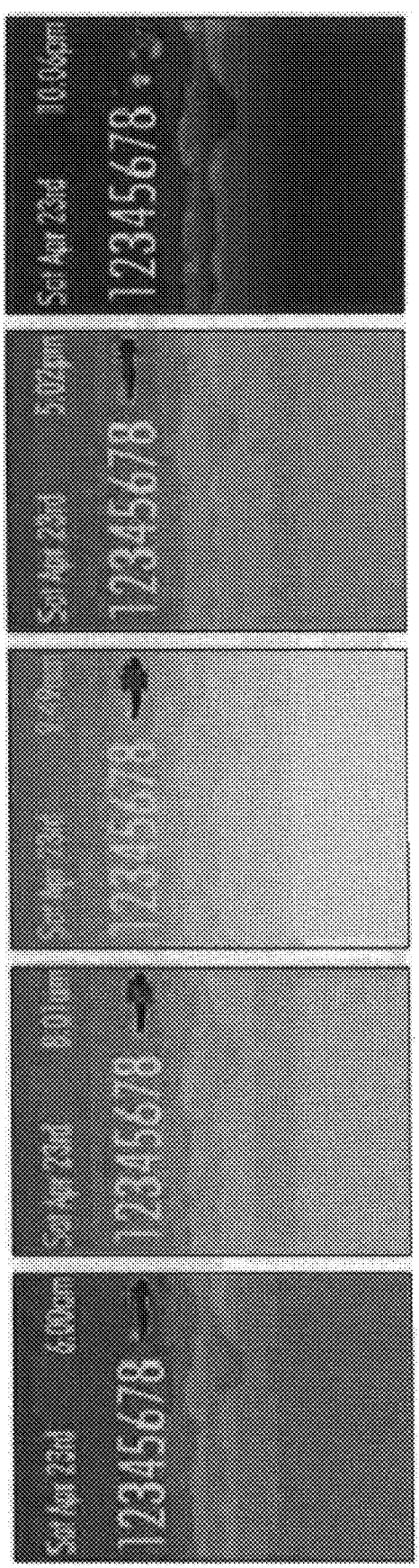
FIG. 4 is a view illustrating background images according to each time zone according to the present invention.
Figure 6A:
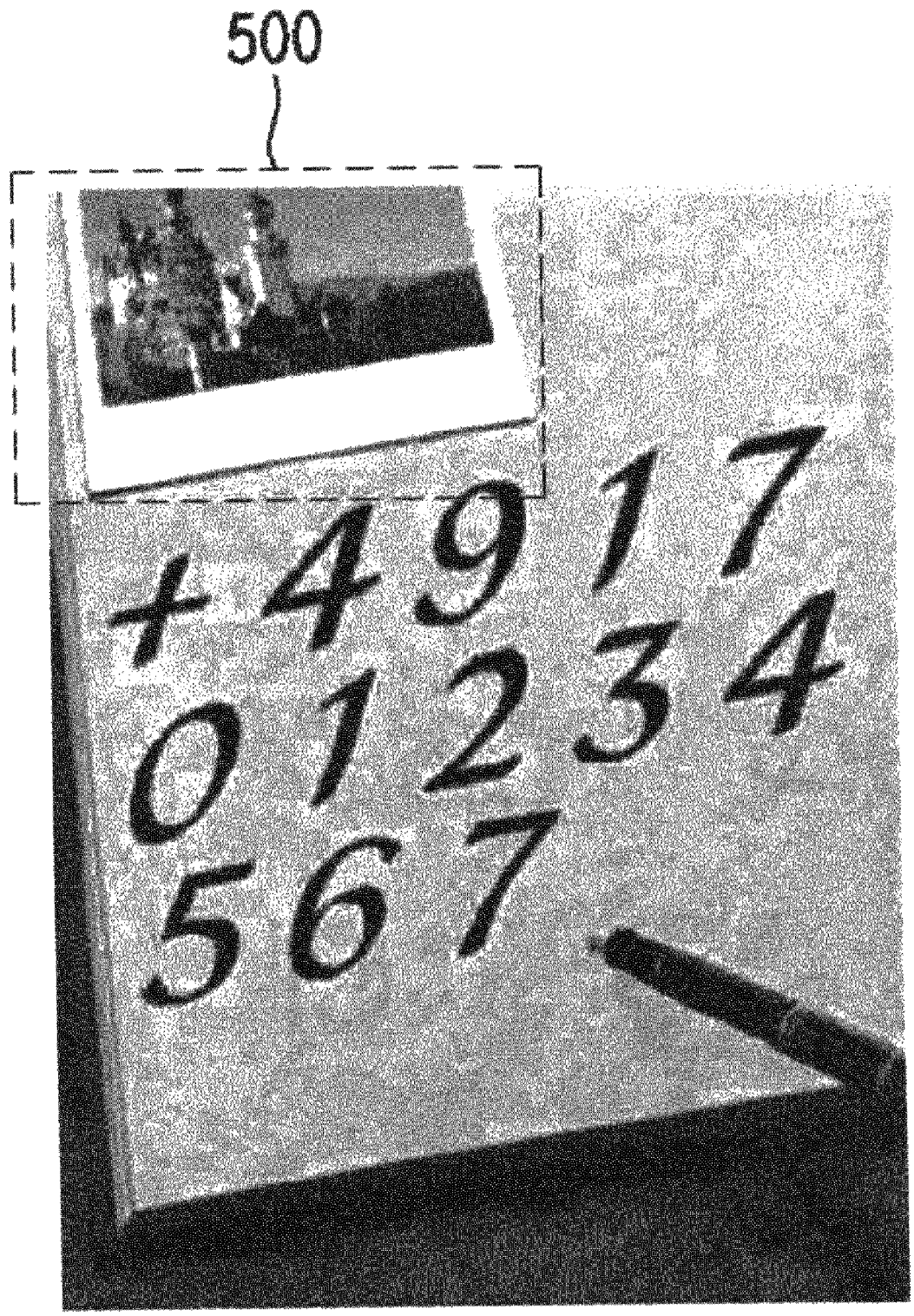
FIGS. 6A and 6B are views illustrating background images according to time zones of a receiving side according to the present invention.
Figure 6B:
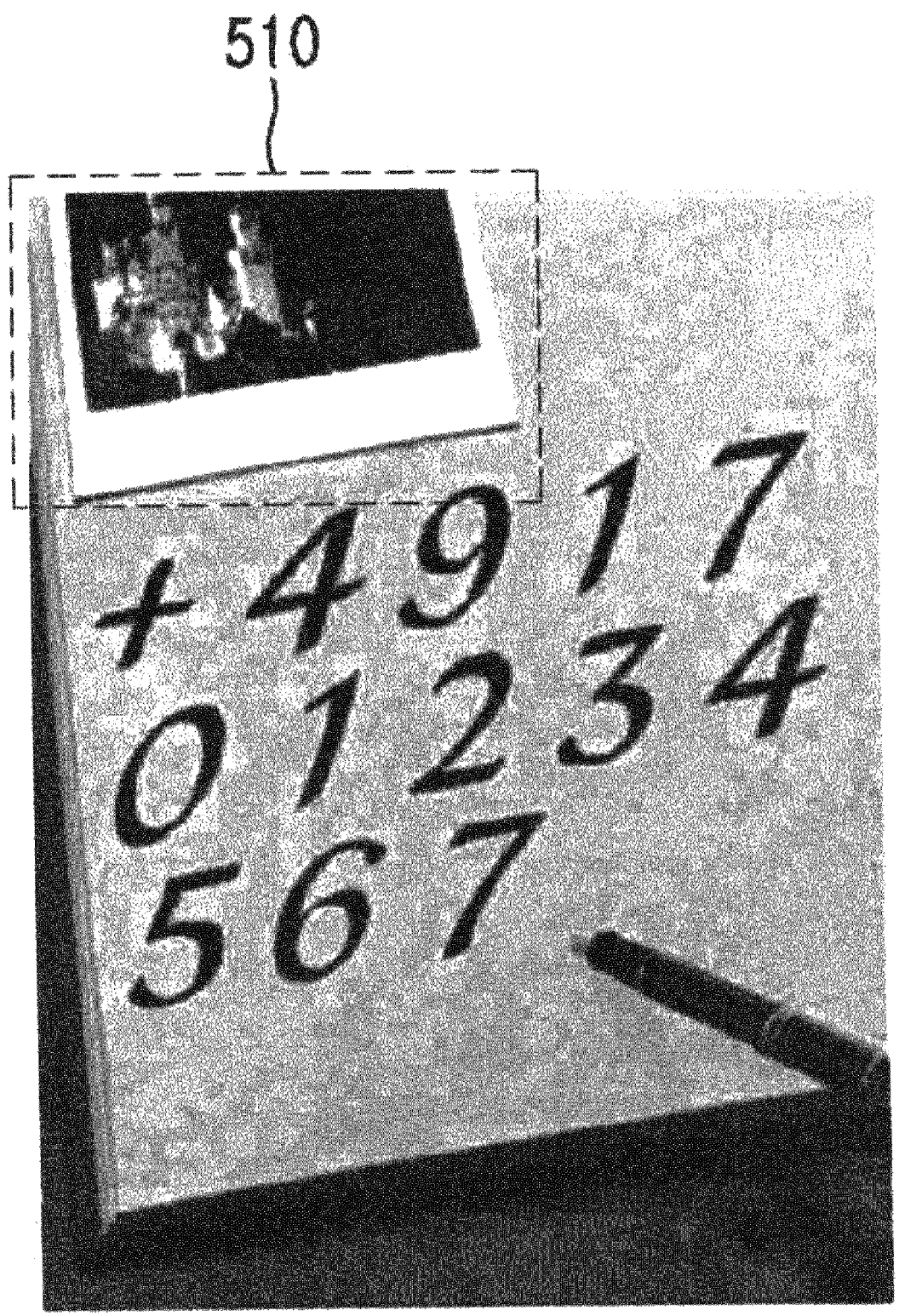

The time layer 200 can display not only a time zone by using various background images (such as dawn, morning, day, afternoon, evening, night, etc. as shown in FIG. 4) with respect to a current location of the mobile terminal or receiving-side area, but also a season by providing background images for each season. Particularly, although FIG. 4 shows a case in which a background image representing a time zone takes up the entire screen of the display unit 120, the background image representing a time zone may instead be disposed only in a part of the screen as shown in FIGS. 6A and 6B. FIG. 6A shows a dialing screen when a time zone of a receiving side corresponds to day, and FIG. 6B shows a dialing screen when a time zone of a receiving side corresponds to night. When the user inputs keys including a specific country code, an image in which a local time zone corresponding to the country code is reflected is provided through the time layer 200, as indicated by reference numbers 500 and 510. As indicated by reference numbers 500 and 510, a time zone is divided into day and night so the time zone can be identified, and a specific image representing the country can be displayed together with the time zone.

Figure 5:
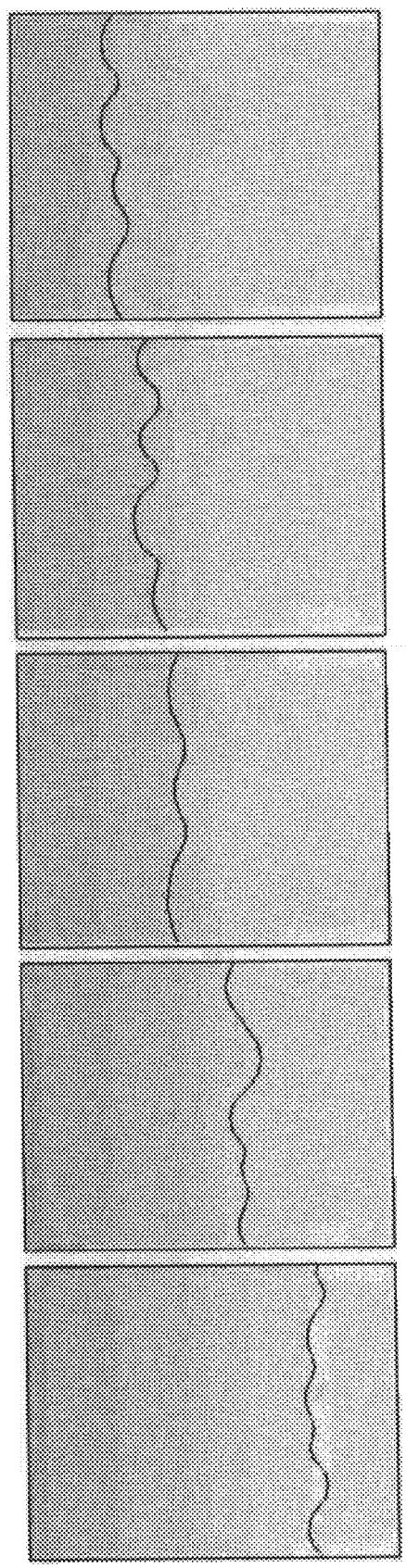
FIG. 5 is a view illustrating visual effect images according to reception sensibility according to the present invention.

The reception sensibility layer 210 can display reception sensibility by varying the amount of clouds, as shown in FIG. 5, and also can use various visual effect images such as the size of a flame to represent a network status, i.e., reception sensibility.

Although FIG. 5 shows a case in which a visual effect image is expressed by means of the amount of clouds according to an exemplary embodiment of the present invention, which is only an example and the scope of the invention is not to be limited by this. That is, various effects may be used according to the selection of the user, a service provider, and a terminal manufacturer. Also, the visual effect image according to the present invention may be created by the user, or may be provided as a form of contents from a content provider and change according the selection of the user.

Differently from FIGS. 4 to 6B, when a visual theme is set, for example, as a "lake", the background image may include various images, such as a lake at night on which moonlight is reflected, a foggy lake at dawn, etc., to represent the time-zone information. The reception sensibility may be represented by means of the degree of waves, and simultaneously, a sound effect of a water drop or the like may be output through the speaker.

When a visual theme is set as "flame", a visual effect image of a growing flame according to reception sensibility may be provided to the reception sensibility layer 210, together with a background image in which time-zone information is reflected. For example, the visual effect image may be provided in such a manner that a small flame represents a good reception sensibility and a larger flame represents a worse reception sensibility. That is, such an effect may be provided in various manners.

The following description will be given with respect to a procedure of providing a dialing screen displayed in various manners as described above.

Figure 7:
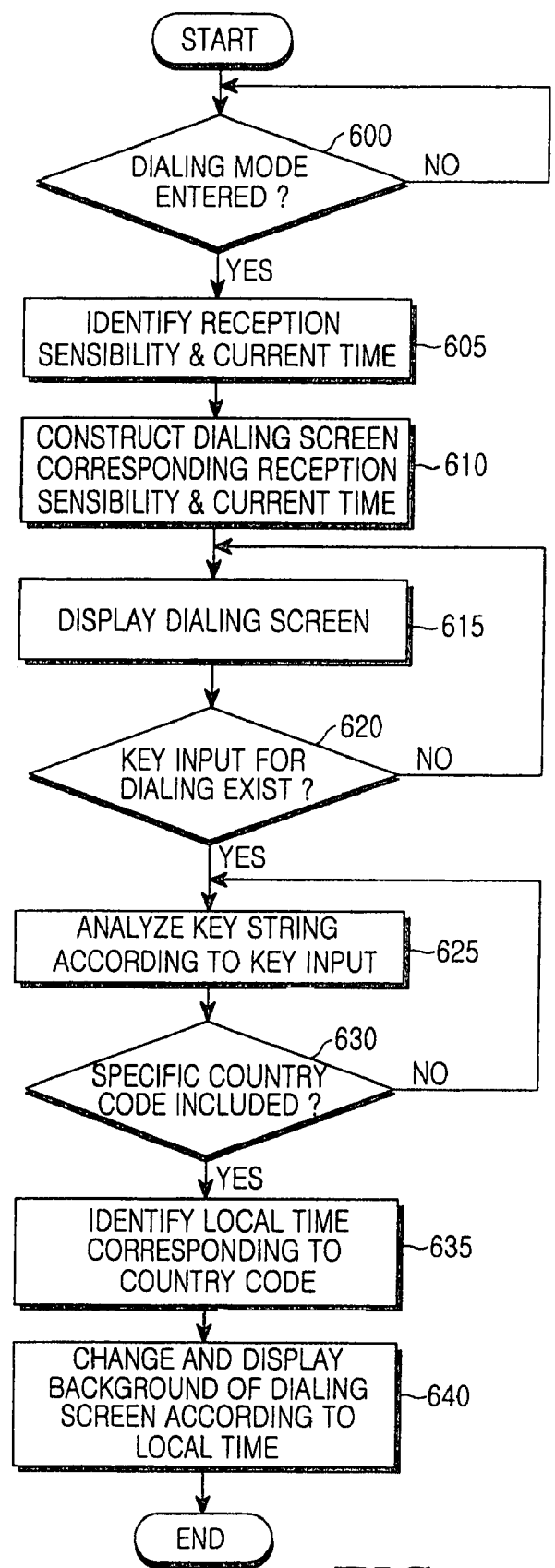
FIG. 7 is a flowchart illustrating a method for providing a dialing screen which changes depending on status information by using a layer structure for a dialing screen in a mobile terminal according to the present invention.

FIG. 7 shows a method for providing a dialing screen which changes depending on status information by using a layer structure for the dialing screen in a mobile terminal according to an exemplary embodiment of the present invention. Although the following description will be described with respect to the dialing screen providing method with reference to FIG. 3, the dialing screen providing method of the present invention is not to be limited by this and may vary.

First, in step 600, the controller 100 determines whether the mobile terminal enters a dialing mode according to the selection of the dialing mode of the user. When the mobile terminal has entered the dialing mode, the controller 100 proceeds to step 605, in which the controller 100 checks reception sensibility and the current time zone. The controller 100 periodically performs reception sensibility measurement operation, which is the same as the typical reception sensibility measurement operation, so a detailed description thereof will be omitted. Then, the controller 100 constructs a dialing screen corresponding to the checked reception sensibility and current time zone in step 610, and displays the constructed dialing screen on the display unit 120 in step 615. The current time zone represents the current time zone of an area in which the mobile terminal is located, that is, the current time zone of an originating side.

Referring to the layer structure shown in FIG. 3, when the mobile terminal enters a dialing mode by the user, a visual effect image based on a visual theme preset corresponding to reception sensibility is output by the reception sensibility layer 210 on a background image corresponding to the current time zone, which is provided by the time layer 200. In other words, a visual effect image which changes depending on reception sensibility, i.e., depending on the intensity of a received signal, is output. For example, as the intensity of a received signal is higher, an effect of a growing flame having a larger size is provided by the reception sensibility layer 210. When the intensity of a received signal is output in a form of cloud, the visual effect image may be output in such a manner that a clear state having fewer clouds is displayed as the intensity of a received signal is good, and more clouds is displayed as the intensity of a received signal becomes worse. It is preferred that a visual effect image is overlapped and displayed on a background image so as to be distinguished from the background image.

Meanwhile, when a dialing screen including a layer structure as described above has been displayed, the controller 100 determines whether a key signal for dialing is input by the user in step 620. When a key signal for dialing is input by the user, the controller 100 analyzes a key string according to the key input in step 625. Then, the controller 100 determines, based on a result of the analysis, whether the key string includes a specific country code in step 630. When it is determined, as a result of the determination of step 630, that the key string includes a specific country code, the controller 100 proceeds to step 635, in which the controller 100 identifies a local time zone corresponding to the country code. Then, the controller 100 reflects a background image corresponding to the current time zone in the dialing screen in step 640. Accordingly, on the dialing screen in which a visual effect image according to reception sensibility overlaps a background image representing the current time zone of a receiving side, numbers and/or characters including special characters according to a key input for dialing are also overlapped and displayed.

According to the present invention as described above, it is possible to adaptively change the construction of a background screen in a mobile terminal according to status information in relation to the mobile terminal. Accordingly, a network status and a time zone of an originating side or receiving side can be recognized at a glance through the dialing screen, thereby increasing the visibility of transmitted information.

Also, according to the present invention, the background screen is constructed by using various visual effect images and visual images according to status information, thereby enabling a sensuous access to information expression.

In addition, according to the present invention, since the time zone of a current location is displayed as a background image, it is possible for the user to recognize the local time zone of a counterpart upon dialing of the user, even without a separate search using a world time menu.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for providing an alphanumeric character inputting screen of a mobile communication terminal, the method comprising:
   determining a received signal strength and a current time zone of the mobile communication terminal;
   displaying an animation data on a background image wherein the animation data changes based on the received signal strength and the background image changes based on a current time zone in the alphanumeric character inputting screen;
   displaying an alphanumeric character on the background image which the animation data is displayed, wherein the alphanumeric character is inputted in response to an alphanumeric character output request in the mobile communication terminal; and
   determining whether an inputted alphanumeric key string includes a specific code that indicates a location; and
   changing the background image based on the current time zone corresponding to a receiving party's location wherein the receiving party time zone corresponding to the inputted specific code.

2. The method according to claim 1, wherein the character output request is at least one of a key input for a dialing and a key input for a text message composition.

3. The method according to claim 1, wherein the animation data is displayed according to a visual theme wherein the visual data varies depending on the received signal strength.

4. The method according to claim 3, wherein the visual theme comprises a weather condition that displays clouds, and wherein fewer are displayed for the animation data as the received signal strength increase.

5. The method according to claim 1, wherein the animation data is visually distinguishable from the outputted alphanumeric character in the screen.

6. A mobile communication terminal having an alphanumeric character inputting screen, the mobile communication terminal comprising:
   a memory for storing a local time zone corresponding to a specific code, an animation data, and a background image corresponding to a time;
   a key input unit for providing key input data according to a key input of a user;
   a controller for providing an animation data that changes based on a strength of a received signal and the background image that changes based on the current time zone in the alphanumeric character inputting screen, and controlling display of a inputted alphanumeric character on the inputting screen, and determining whether the inputted alphanumeric key string includes the specific code that indicates a location then changing the background image based on a current time zone of receiving party's location corresponding to the specific code; and
   a display unit for providing the animation data that shows the received signal strength and the inputted alphanumeric character superimposed upon the background image to create the character inputting screen.

7. The mobile communication terminal according to claim 6, wherein the controller controls the display of the inputted alphanumeric character to be distinguishable from the animation data in the screen.

8. The mobile communication terminal according to claim 6, wherein the key input comprises at least one of a dialing and a text message composition.

* * * * *